UNITED STATES PATENT OFFICE.

WILLIAM L. JONES, OF ATLANTA, GEORGIA.

COMPOSITION FOR MAKING BRICK.

1,054,002. Specification of Letters Patent. Patented Feb. 25, 1913.

No Drawing. Application filed November 27, 1911. Serial No. 662,605.

*To all whom it may concern:*

Be it known that I, WILLIAM L. JONES, a citizen of the United States, residing at Atlanta, in the county of Fulton and State of Georgia, have invented certain new and useful Improvements in Compositions for Making Brick, of which the following is a specification.

This invention relates to a composition of matter for making a concrete brick.

The object of my invention is to compound a brick at a reduction in cost over the bricks as prepared now-a-days, and which will possess the desirable features to be found in bricks and stand any water-proofing test to which it may be submitted in use.

The leading feature of my invention contemplates the production of a brick in connection with which there will be no burning and in which there will be a total absence of clay,—incidents tending largely to increase the expense of manufacture, as known to those skilled in the art.

Bricks made in accordance with my compound will be water resisting and may with great advantage be used in foundations for rivers and generally for ornamental work. The manufacture of bricks as now carried on has resulted in the molded product losing the tenacious properties for resisting moisture shortly after it has been subjected to a severe water test, and wherever a waterproof brick has been produced it was devoid of the essence of solidity common to concrete bricks, being besides too costly and of little value from a commercial standpoint. The concrete brick formed by compounding the ingredients to be stated eliminates some of the ingredients most commonly used in bricks supplanting these by others which I have found upon test and experiment to possess the qualities most needed in a commercially successful brick of the character described.

For compounding the concrete brick the following ingredients will be used in the proportions set forth or thereabout:—

| Ingredient | Proportion |
|---|---|
| Isinglass | 1 per cent. |
| Coloring | 8 " " |
| Creosote | 1 " " |
| Cement | 35 " " |
| Pulverized granite | 35 " " |
| Sand | 20 " " |

It will be understood that the above proportions of the ingredients may be varied and modified, in practice without sacrificing any of the qualities of the concrete brick which I have produced. It will be obvious that a given number of pounds of the above ingredients may be used to produce a given number of bricks. The bricks thus produced will be pressed bricks and will differ from others in needing no clay or burning to give them the desired consistency and solidity. The concrete brick will be made in cast steel molds of the standard size, preferably so that the product may be of standard weight, and will be formed under a pressure of two hundred pounds, and molded in twenty-one shades and tints; the ingredients used are of a kindred nature and when mixed with the proper per cent. of each will make a very solid, sound, moisture resisting and a relatively moisture-proof concrete brick. These ingredients are all mixed and thoroughly moistened with water, but what water is used in making the bricks will dry out, and when finished, water will have no effect on the brick at all. Plaster can be prepared out of the same ingredients using only, a different proportion and for finish the compound can be most advantageously used.

The ingredients used coöperate to give the concrete brick the solidity, tenacity, and consistency required. The isinglass gives the brick a glittering effect, especially on bright and fair days; the coloring is used to make it as nearly like clay as possible, and the twenty-one shades hereinbefore mentioned subserve a variety of tint; the creosote is used to make the bricks slip out of the molds and in order to give it a real slick and glossy finish; cement is the strengthening agent while the granite makes up the body of the concrete brick; sand is the binding vehicle and holds together the rest of the ingredients.

I claim and desire to secure by Letters Patent:

A concrete brick composed of isinglass, coloring, creosote, cement, pulverized granite and sand.

In testimony whereof I affix my signature in presence of two witnesses.

WILLIAM L. JONES.

Witnesses:
C. W. TERRELL,
C. E. WILSON.